United States Patent
Lee

(10) Patent No.: US 10,956,966 B2
(45) Date of Patent: Mar. 23, 2021

(54) METHOD, NON-TRANSITORY COMPUTER-READABLE MEDIUM, AND SYSTEM FOR ONLINE TRANSACTION USING OFFLINE EXPERIENCE

(71) Applicant: NHN Entertainment Corporation, Seongnam-si (KR)

(72) Inventor: Youn Sik Lee, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 15/701,513

(22) Filed: Sep. 12, 2017

(65) Prior Publication Data

US 2018/0082360 A1 Mar. 22, 2018

(30) Foreign Application Priority Data

Sep. 19, 2016 (KR) .......................... 10-2016-0119454

(51) Int. Cl.
 *G06Q 30/00* (2012.01)
 *G06Q 30/06* (2012.01)
 *G06F 3/01* (2006.01)

(52) U.S. Cl.
 CPC ..... *G06Q 30/0643* (2013.01); *G06Q 30/0601* (2013.01); *G06F 3/011* (2013.01)

(58) Field of Classification Search
 None
 See application file for complete search history.

(56) References Cited

U.S. PATENT DOCUMENTS

| 7,945,484 B1* | 5/2011 | Tam | G06Q 30/06 705/26.1 |
| 2007/0055579 A1 | 3/2007 | Ha | |
| 2009/0049285 A1* | 2/2009 | Kurosawa | H04N 21/235 712/225 |
| 2012/0099756 A1* | 4/2012 | Sherman | G06Q 30/06 382/100 |

(Continued)

FOREIGN PATENT DOCUMENTS

| JP | 2003-099629 | 4/2003 |
| JP | 2005-250586 | 9/2005 |

(Continued)

OTHER PUBLICATIONS

Marder, M., Using Image Analysis to Monitor Retail Store Shelves, Mar. 1, 2015, IBM Journal of Research and Development, vol. 59, pp. 3:1-3:11 (Year: 2015).*

(Continued)

*Primary Examiner* — Jeffrey A. Smith
*Assistant Examiner* — Timothy J Kang
(74) *Attorney, Agent, or Firm* — H.C. Park & Associates, PLC

(57) ABSTRACT

A method and system for online transaction using an offline experience. A computer-implemented method may include providing, to an electronic device, an internal image of an offline store registered as an affiliate to an online open market; recognizing a product displayed in the offline store in the internal image; generating a user interface using a virtual object for the product recognized in the internal image; and providing a service associated with a corresponding product with respect to a product selected through the user interface.

15 Claims, 11 Drawing Sheets

(56) References Cited

U.S. PATENT DOCUMENTS

| | | | | |
|---|---|---|---|---|
| 2012/0233003 A1* | 9/2012 | Calman | ............... | G06Q 30/06 |
| | | | | 705/16 |
| 2015/0026156 A1* | 1/2015 | Meek | ............... | G06F 16/35 |
| | | | | 707/722 |
| 2016/0260161 A1* | 9/2016 | Atchley | ............... | E01H 5/12 |
| 2016/0283996 A1* | 9/2016 | Bakhshaie | ......... | G06Q 30/0613 |

FOREIGN PATENT DOCUMENTS

| | | |
|---|---|---|
| JP | 2012-190094 | 10/2012 |
| JP | 2013-167973 | 8/2013 |
| JP | 2014-218313 | 11/2014 |
| JP | 2014-228916 | 12/2014 |
| JP | 2016-071525 | 5/2016 |
| KR | 10-0460008 | 11/2004 |
| WO | 01/086533 | 11/2001 |

OTHER PUBLICATIONS

The Japanese Decision of Refeusal dated Feb. 26, 2019, issued in Japanese Pantent Application No. 2017-174670.

Office Action dated Jun. 19, 2018, issued in Japanese Patent Application No. 2017-174670.

\* cited by examiner

METHOD, NON-TRANSITORY COMPUTER-READABLE MEDIUM, AND SYSTEM FOR ONLINE TRANSACTION USING OFFLINE EXPERIENCE

CROSS REFERENCE TO RELATED APPLICATION

This application claims priority from and the benefit of Korean Patent Application No. 10-2016-0119454, filed on Sep. 19, 2016, which is hereby incorporated by reference for all purposes as if fully set forth herein.

BACKGROUND

Field

Exemplary embodiments of the present invention relate to an online transaction processing technology.

Discussion of the Background

With the popularization of the Internet, distribution and sales of goods and services using Internet shopping malls are being actively performed. Currently, as opportunities for mobile business using smartphones and the like are expanding, the mobile shopping market is also rapidly increasing.

Korean Patent Registration No. 10-0460008, registered on Nov. 25, 2004, discloses an online shopping search service providing method and system that may construct a database systematically including information about a product registrant, a product registered by the product registrant, and a seller selling the product, and may perform a series of processes associated with an online shopping search service using the database.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments of the present invention provide a method and system that may provide an offline shopping experience in an online open market.

Exemplary embodiments also provide a method and system that may display detailed information of a product selected by a user through an offline shopping experience and may connect to an actual purchase.

Exemplary embodiments also provide a method and system that may link a shopping model of providing an offline shopping experience with local advertising.

Additional features of the invention will be set forth in the description which follows, and in part will be apparent from the description, or may be learned by practice of the invention.

An exemplary embodiment of the present invention discloses a product information providing method performed by a product information providing system configured as a computer, the method including providing, to an electronic device, an internal image of an offline store registered as an affiliate to an online open market; recognizing a product displayed in the offline store in the internal image; generating a user interface using a virtual object for the product recognized in the internal image; and providing a service associated with a corresponding product with respect to a product selected through the user interface.

The internal image of the offline store may be a real image that is captured from an interior of the offline store through a network-based photographing device or a virtual reality (VR) image that is created as an indoor panoramic photo of the offline store.

The providing of the internal image may include recommending at least one adjacent affiliate based on a location specified by the electronic device.

The providing of the internal image may include providing at least one affiliate in which a specific product and a substitute product associated with the specific product are included in a pre-stored display product list in response to a user of the electronic device searching for the specific product.

The product information providing system may further include manipulating the internal image in response to a manipulation request of the electronic device for the internal image.

The internal image of the offline store may be a real image that is captured from an interior of the offline store through a network-based photographing device, and the manipulating of the internal image may include transferring an image control signal to the photographing device in response to the manipulation request and controlling the photographing device to manipulate the internal image.

The recognizing of the product may include recognizing the product by recognizing at least one of a unique identification code and a text in an image corresponding to the internal image.

The recognizing of the product may include recognizing the product in the internal image through an image search in conjunction with an image database on the Internet.

The generating of the user interface may include generating and displaying a virtual object that includes information about the product recognized in the internal image.

The generating of the user interface may include generating and displaying a virtual object using a user interface for a movement function to a page that includes detailed information of a corresponding product with respect to products recognized in the internal image or a payment function for the corresponding product.

The generating of the user interface may include generating and displaying a virtual object distinguished from other products with respect to a portion of products recognized in the internal image.

The providing of the service may include moving to a page that includes detailed information of the selected product or providing a payment function for the selected product.

An exemplary embodiment of the present invention also discloses a non-transitory computer-readable recording medium storing instructions that, when executed by a processor, cause the processor to perform a product information providing method including providing, to an electronic device, an internal image of an offline store registered as an affiliate to an online open market; recognizing a product displayed in the offline store in the internal image; generating a user interface using a virtual object for the product recognized in the internal image; and moving to a page that includes detailed information or providing a payment function in conjunction with a service associated with a corresponding product with respect to a product selected through the user interface.

An exemplary embodiment of the present invention also discloses a product information providing system configured as a computer, including at least one processor configured to execute computer-readable instructions, wherein the at least one processor provides a provider configured to provide, to an electronic device, an internal image of an offline store registered as an affiliate to an online open market; a recognizer configured to recognize a product displayed in the offline store in the internal image; a generator configured to generate a user interface using a virtual object for the product recognized in the internal image; and an interlocker configured to move to a page that includes detailed information or to provide a payment function in conjunction with a service associated with a corresponding product with respect to a product selected through the user interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
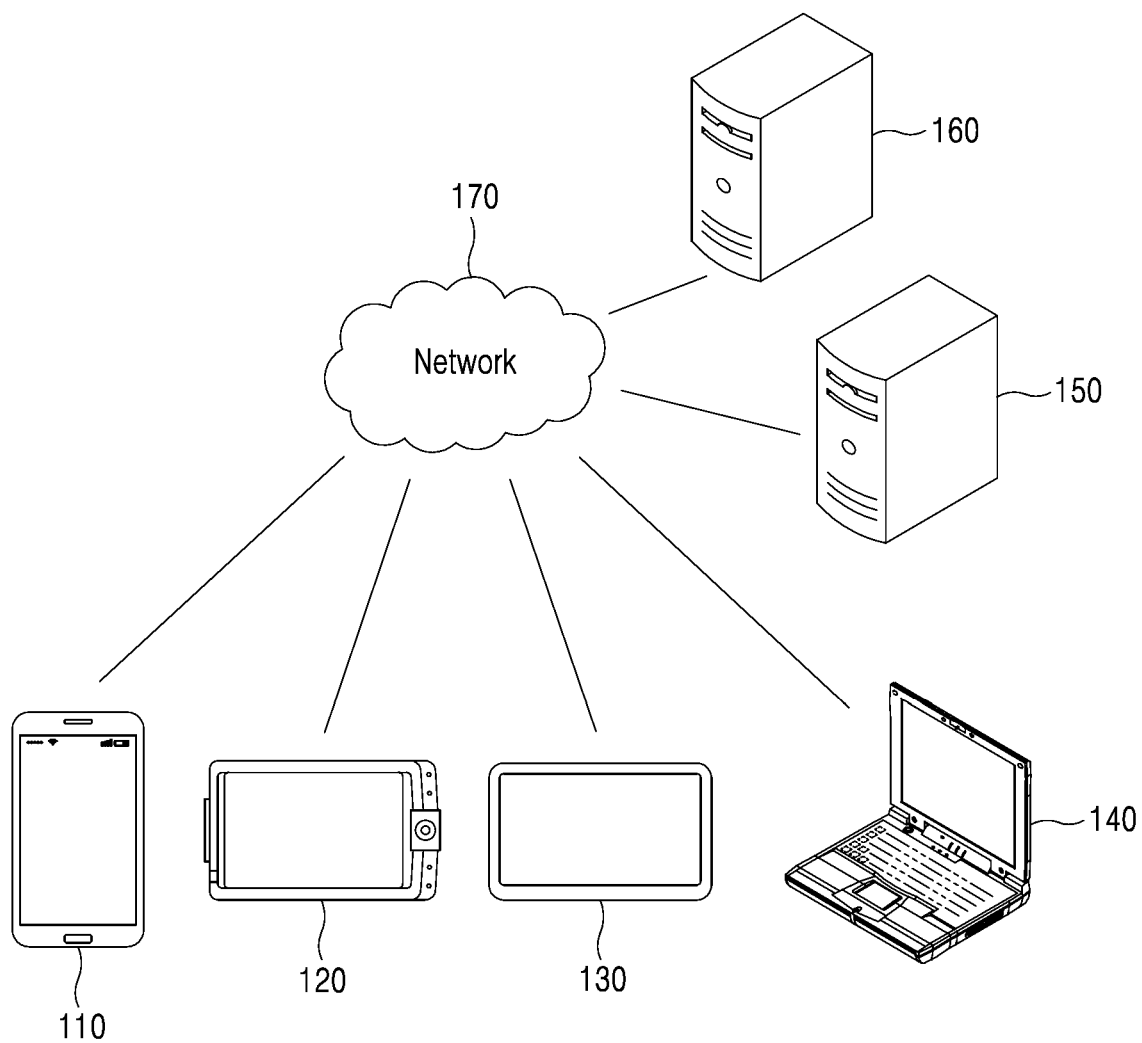
FIG. 1 illustrates an example of a network environment according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including,"

when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments will be described in detail with reference to the accompanying drawings. These exemplary embodiments will be described in detail for those skilled in the art in order to practice the present disclosure. It should be appreciated that various exemplary embodiments are different but do not have to be exclusive. For example, specific shapes, configurations, and characteristics described in an exemplary embodiment may be implemented in another exemplary embodiment without departing from the spirit and the scope of the present disclosure. In addition, it should be understood that position and arrangement of individual components in each disclosed exemplary embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

Hereinafter, exemplary embodiments are described in detail with reference to the accompanying drawings.

The exemplary embodiments relate to an online transaction processing technology, and more particularly, to a shopping model for providing an offline shopping experience in an online open market.

The exemplary embodiments disclosed herein may configure an online shopping model using an online shopping experience and may also achieve advantages in terms of efficiency, convenience, cost saving, and the like.

FIG. 1 illustrates an example of a network environment according to exemplary embodiments. Referring to FIG. 1, the network environment includes a plurality of electronic devices 110, 120, 130, and 140, a plurality of servers 150 and 160, and a network 170. FIG. 1 is provided as an example only, and a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only examples and exemplary embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the electronic device 110 may connect to the server 150 under control of at least one program, for example, a browser or a dedicated application, or an operating system (OS) included in the electronic device 110, and may receive a service or content provided from the server 150. For example, in response to a service request message that is transmitted from the electronic device 110 to the server 150 over the network 170 under control of the application, the server 150 may transmit a code corresponding to the service request message to the electronic device 110. The electronic device 110 may provide the content to the user by configuring and displaying a screen corresponding to the code under control of the application.

Figure 2:
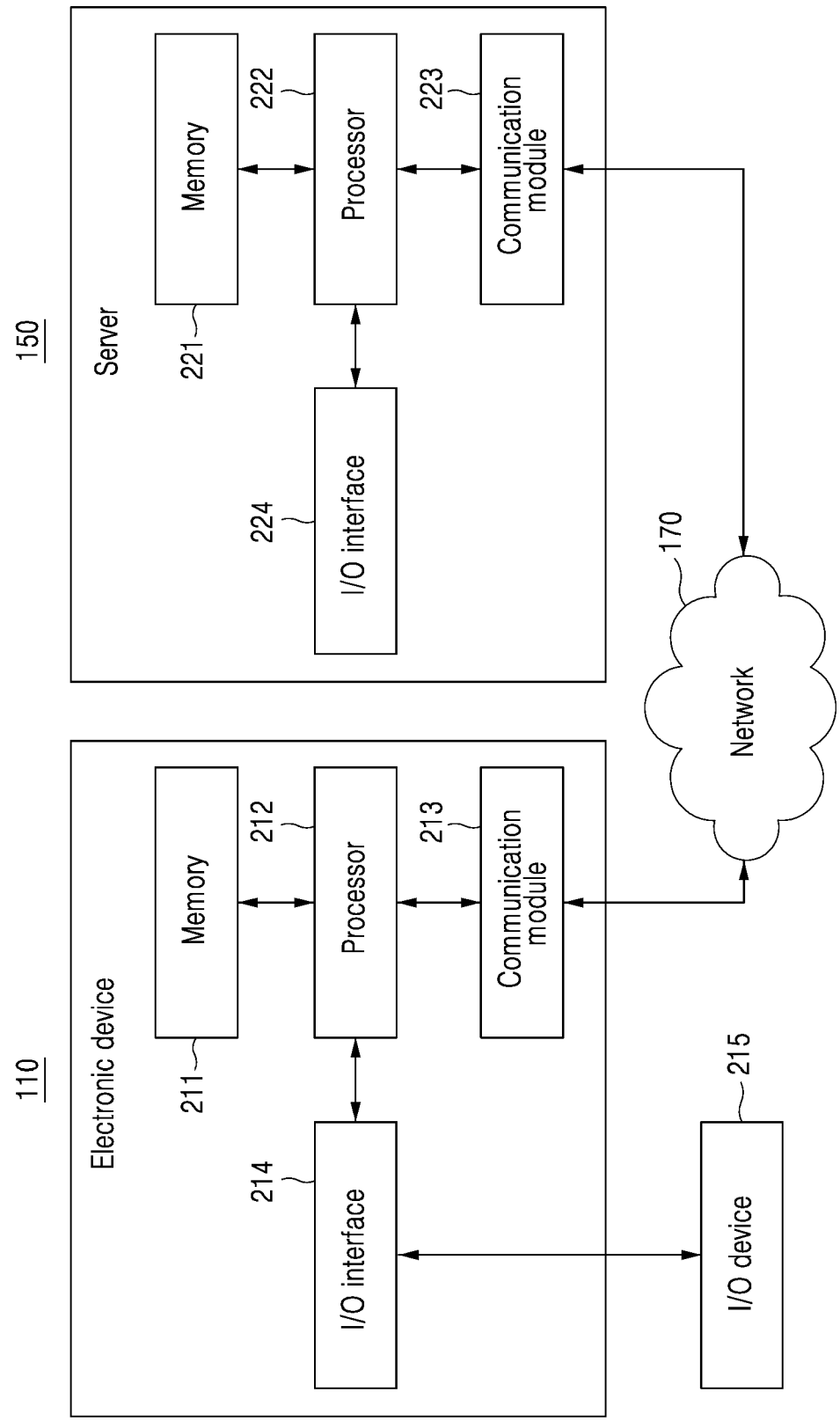
FIG. 2 illustrates an example of an electronic device and a server according to exemplary embodiments.

FIG. 2 illustrates an example of a configuration of an electronic device and a server according to exemplary embodiments. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS or at least one program code, for example, a code for a browser or a dedicated application installed and executed on the electronic device 110, may be stored in the memory 211, 221. Such software components may be loaded from another computer-readable storage medium separate from the memory 211, 221. The other computer-readable storage medium may include, for example, a floppy drive, a disk, a tape, a DVD/CD-ROM drive, a memory card, etc. According to other exemplary embodiments, software components may be loaded to the memory 211, 221 through the communication module 213, 223, instead of, or in addition to, the computer-readable storage medium. For example, at least one program may be loaded to the memory 211, 221 based on a program, for example, the dedicated application, installed by files provided over the network 170 from developers or a file distribution system (not shown) that provides an installation file of the application.

The processor 212, 222 may be configured to process computer-readable instructions by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other exemplary embodiments, the electronic device 110 and the server 150 may include a greater or lesser number of components than the number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibrator for vibration, etc., which are generally included in the smartphone.

Hereinafter, exemplary embodiments of a system and method for providing product information using an offline experience in an online open market are described.

Figure 3:
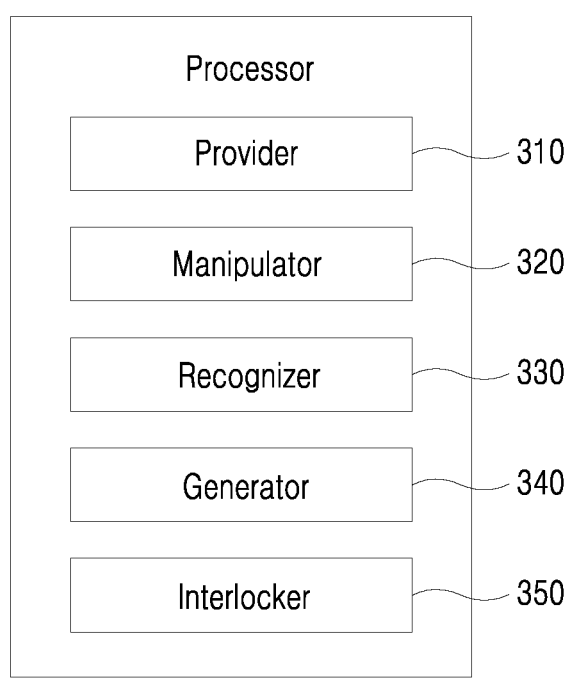
FIG. 3 illustrates an example of components includable in a processor of a server according to exemplary embodiments.
Figure 4:
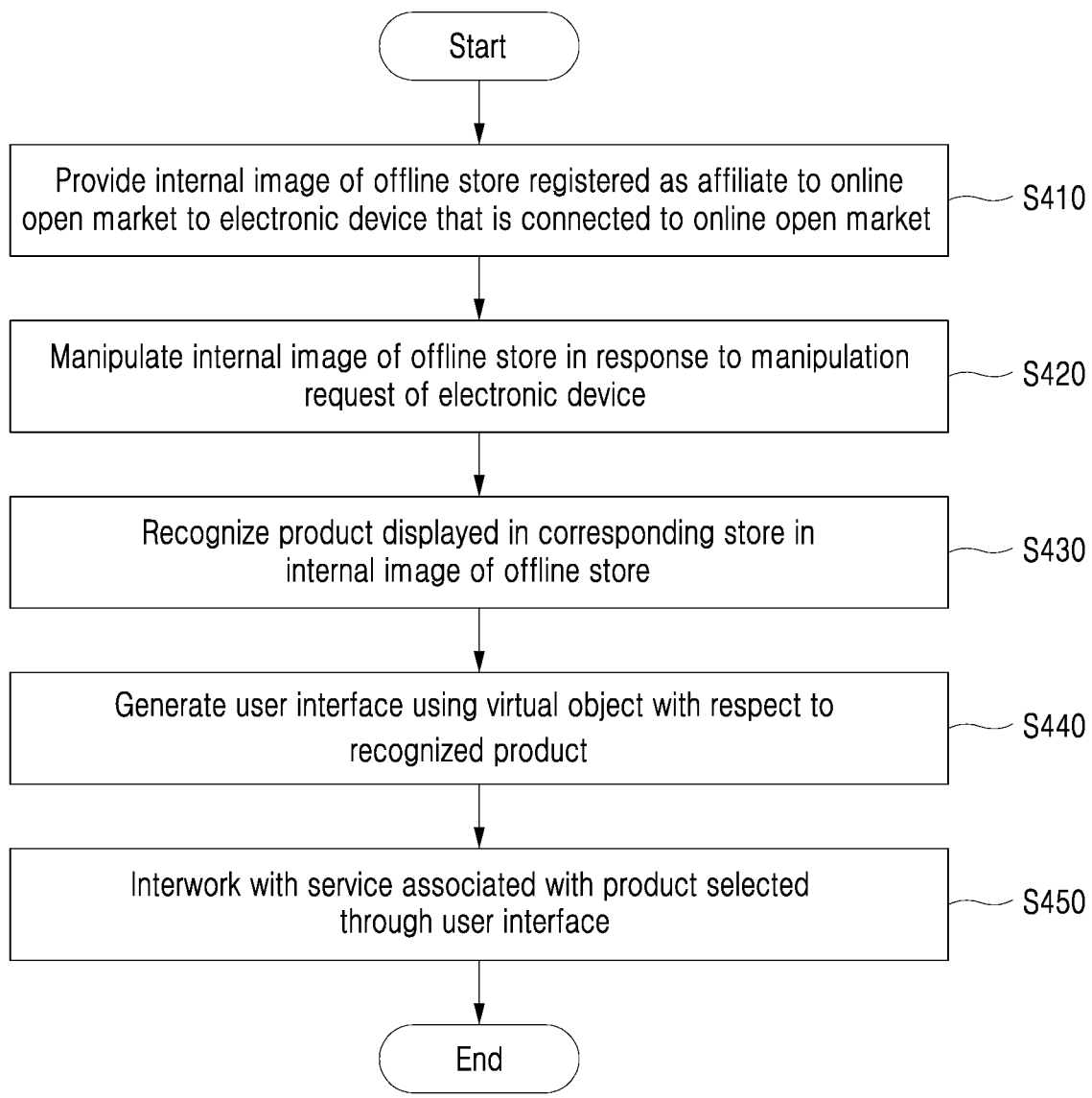
FIG. 4 is a flowchart illustrating an example of a method performed by a server according to exemplary embodiments.

FIG. 3 illustrates an example of components includable in a processor according to exemplary embodiments, and FIG. 4 is a flowchart illustrating an example of a method performed by a server according to exemplary embodiments.

Referring to FIG. 3, the processor 222 of the server 150 may be configured with instructions to provide software modules that include a provider 310, a manipulator 320, a recognizer 330, a generator 340, and an interlocker 350. The processor 222 and the components of the processor 222 may control the server 150 to perform operations S410 through S450 included in the method of FIG. 4. Here, the processor 222 and the components of the processor 222 may be configured to execute an instruction according to a code of at least one program and a code of the OS included in the memory 221. Also, the components of the processor 222 may be representations of different functions performed by the processor 222 in response to a control instruction provided from the OS or the application. For example, the provider 310 may be used as a functional expression that the processor 222 provides an image of an online shop in response to the control instruction.

In operation S410, the provider 310 may provide an internal image of an offline store registered as an affiliate to an online open market to the electronic device 110 that is connected to the online open market. The online open market is an e-commerce site that is open to both sellers and purchasers, and refers to an intermediary Internet shopping mall in which an individual or a small company may freely trade products online. The server 150 may serve as a service platform for the online open market and accordingly, the provider 310 may provide a store image of an affiliate registered on the service platform to service users. The internal image of the offline store contains an image of the offline store in which products are displayed and may be a real image that is captured from an interior of the offline store, a virtual reality (VR) image, and the like, which are received from a terminal device associated with the offline store.

For example, the server 150 may interwork with an IP camera service for the offline store, and may receive an actual internal image of the offline store in real time or periodically through a camera installed in the offline store. As another example, the server 150 may construct in advance a VR image, such as an indoor panoramic photo, on the service platform with respect to each offline store. That is, the provider 310 may provide products displayed in the offline store to the user using a real image that is captured through a photographing device, such as a network-based closed-circuit television (CCTV), from the offline store or an image that is created as virtual content, such as VR, in the online open market.

Figure 5:
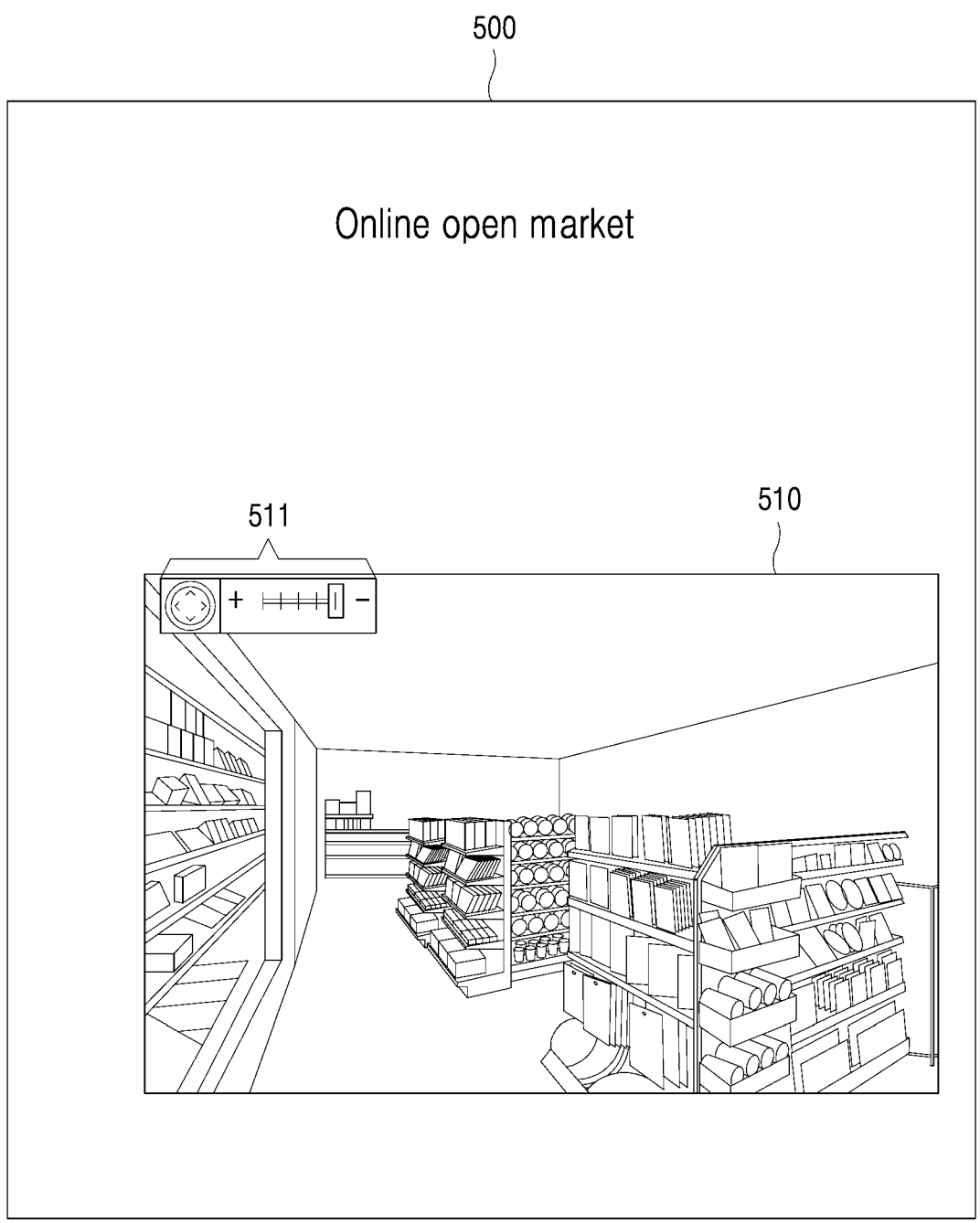
FIG. 5 illustrates an example of a service screen that provides an internal image of an offline store according to exemplary embodiments.

FIG. 5 illustrates an example of a service screen that provides an internal image of an offline store according to exemplary embodiments. Referring to FIG. 5, the provider 310 may display an internal image 510 of an offline store specified by the user of the electronic device 110 on a service screen 500 of an online open market. The provider 310 may show products that are actually displayed in a corresponding store through a real image or a VR image of the offline store to provide an offline shopping experience to the user in the online open market.

The server 150 may construct in advance, on a service platform, identification information, location information, a list of displayed products, detailed information of each product, uniform resource locator (ULR) information, etc., of an offline store as information associated with the offline store with respect to each of offline stores registered as affiliates. The provider 310 may provide a service for searching for or recommending an affiliate that provides an internal image of an offline store, a product displayed in a store of each affiliate, in the online open market, based on the constructed information. For example, the provider 310 may select and recommend at least one affiliate that is present within a predetermined radius from a location specified by the electronic device 110, for example, a current location of the electronic device 110 or a set location of the electronic device 110. As another example, the provider 310 may select and recommend at least one affiliate based on profile information collected about the user of the electronic device 110, for example, a gender, an age, a service use history or preference, and the like. As another example, in response to the user of the electronic device 110 searching for a specific store in the online open market, the provider 310 may provide at least one affiliate corresponding to the search request as a search result. As another example, in response to the user of the electronic device 110 searching for a specific product in the online open market, the provider 310 may provide at least one affiliate in which the specific product is displayed as the search result. Here, if no store stores the retrieved specific product, it is possible to recommend a substitute product or service. In this manner, an affiliate recommendation or search logic may induce a use of a corresponding affiliate in conjunction with local advertising.

Figure 6:
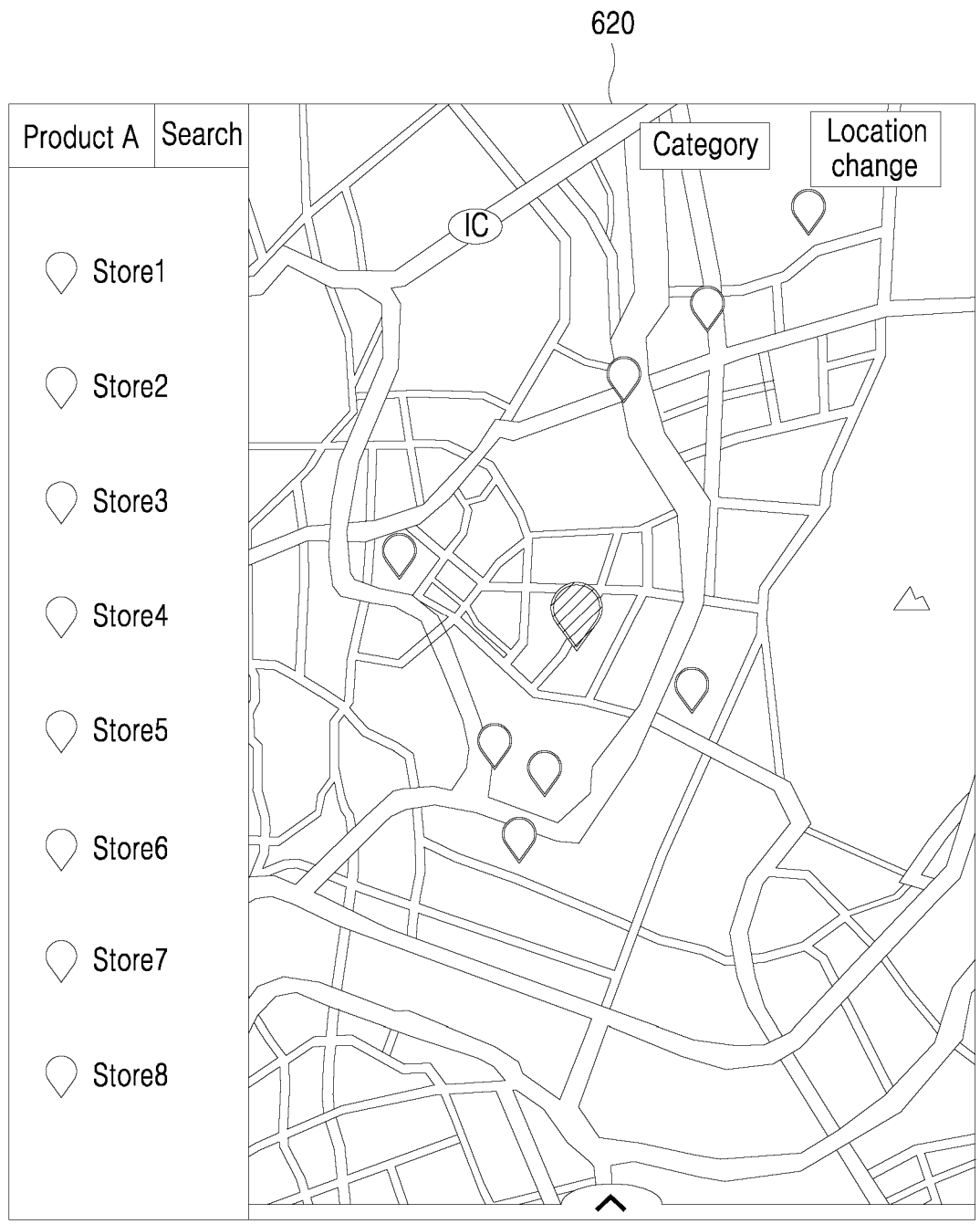
FIG. 6 illustrates an example of a map screen that provides a location of an affiliate according to exemplary embodiments.

The provider 310 may select at least one affiliate during a recommendation process or a search process and may display the selected at least one affiliate in a form of a map or a list for the user. For example, referring to FIG. 6, in response to the user searching for "product A" in the online open market, the provider 310 may provide a map screen 620 that includes locations of affiliates each in which the product A is displayed. When providing a search result, the provider 310 may pin an affiliate available by the user on a map in conjunction with local advertising and may induce the user to use the affiliate.

The provider 310 may display information about an offline store registered as an affiliate using a variety of methods in the online open market. In response to receiving a selection on a specific affiliate among affiliates provided through a recommendation process or a search process from the electronic device 110, the provider 310 may provide the internal image 510 of the selected affiliate of FIG. 5 to the electronic device 110.

In operation S420, the manipulator 320 may manipulate the internal image of the offline store in response to a manipulation request of the electronic device 110 for the internal image of the offline store. The manipulator 320 may provide an image control interface for a viewpoint movement, zoom-in, zoom-out, etc., with respect to the internal image of the offline store that is provided in the online open market. The user may search for products displayed in the corresponding store while controlling the internal image of the offline store through the user control interface.

Figure 7:
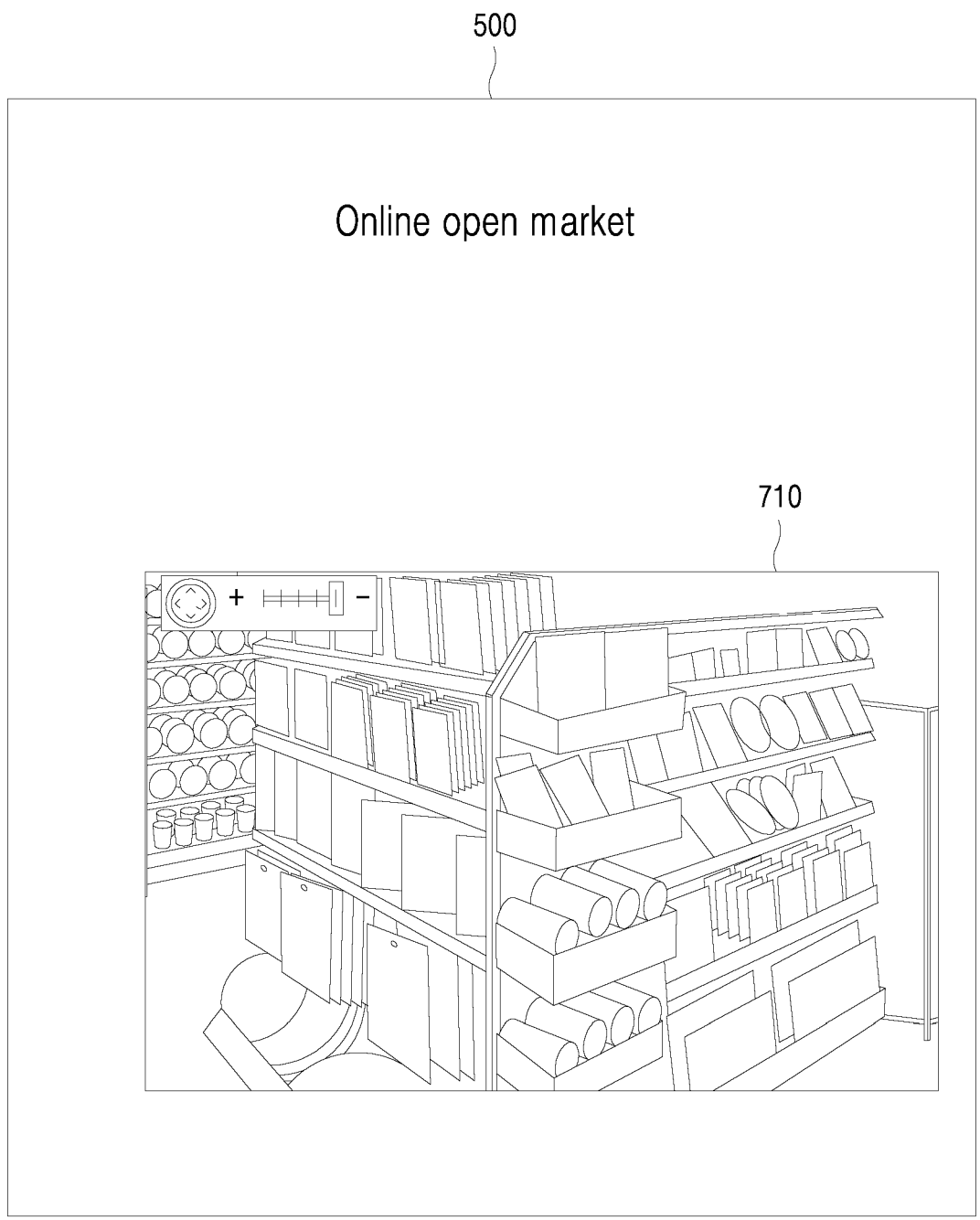
FIG. 7 illustrates an example of a service screen that provides an enlarged internal image of an offline store according to exemplary embodiments.

Referring to FIG. 5, an image control interface 511 including a viewpoint movement interface for moving a viewpoint in all directions with respect to the internal image 510 of the offline store, a zoom-in/out interface for enlarging or reducing the internal image, and the like, may be provided. In response to a manipulation request using the image control interface 511, the manipulator 320 may control the internal image 510 of the offline store that is displayed on the service screen 500 of the online open market. If the internal image 510 of the offline store is a real image that is captured from a photographing device, such as a network-based CCTV, installed in the store, the manipulator 320 may directly transfer an image control signal corresponding to the manipulation request of the user to the photographing device installed in the store, and may control an image of the store in real time. If the internal image 510 of the offline store is a VR image, such as an indoor panoramic photo created in advance on a service platform, the user may control the image on a service immediately. In response to receiving a zoom-in request from the user using the image control interface 511 with respect to the internal image 510 of the offline store, an enlarged internal image 710 of the offline store may be displayed on the service screen 500 of the online open market as shown in FIG. 7.

In operation S430, the recognizer 330 may recognize products displayed in the corresponding store in the internal image of the offline store. For example, the recognizer 330 may recognize a product in an image by recognizing a unique identification code, such as a barcode, a quick read (QR) code, etc., printed on the product, or a text such as a brand name. As another example, the recognizer 330 may recognize a product in an image through a scheme of extracting a local feature in the image, using an image analysis technology, a learning model, and the like. As another example, the recognizer 330 may recognize a product in an image by performing an image search on a region of interest (IOR) in the image in conjunction with an image database on the Internet. A technology for recognizing a product in an image is not limited thereto and at least one known art may be used.

Figure 8:
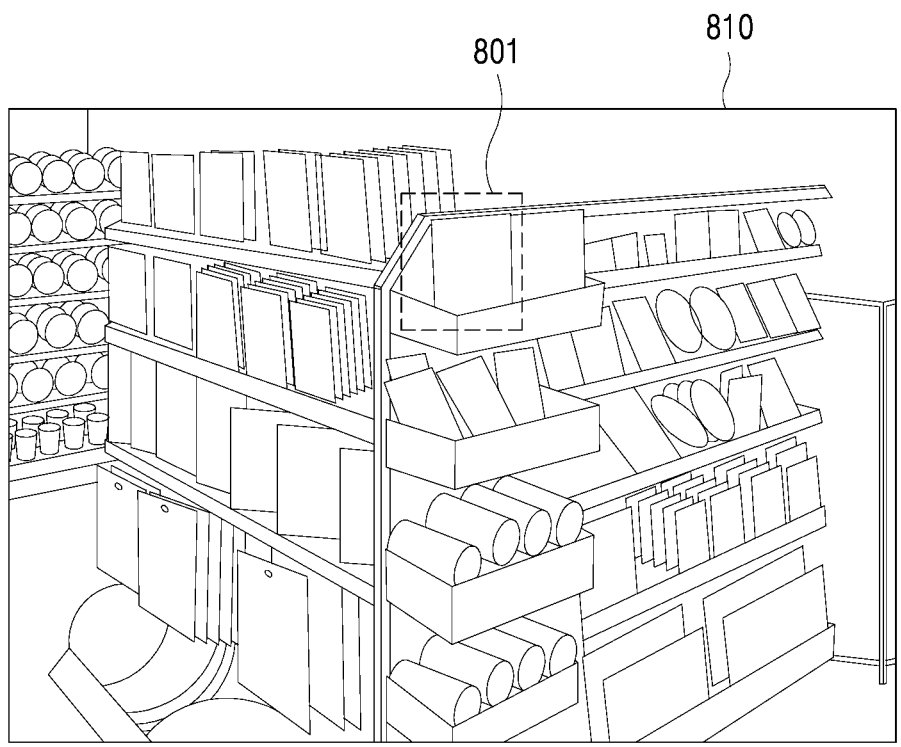
FIG. 8 illustrates an example of a process of recognizing a product in an internal image of an offline store according to exemplary embodiments.

FIG. 8 illustrates an example of a process of recognizing a product in an internal image of an offline store according to exemplary embodiments. Referring to FIG. 8, the recognizer 330 may recognize products in an internal image 810 of an offline store, that is, products 801 displayed in the offline store using various technologies for recognizing an object included in an image. Here, the recognizer 330 may extract information about a corresponding product from information constructed on a service platform or an Internet product database with respect to each of the products 801 recognized in the internal image 810 of the offline store.

In operation S440, the generator 340 may generate a user interface using a virtual object with respect to the product recognized in the internal image of the offline store. For example, the generator 340 may generate a virtual object with respect to a product recognized in an internal image of an offline store and may display the virtual object on a corresponding image screen. Here, the virtual object may include information about the product that is recognized through a barcode recognition, an image recognition, etc. The virtual object may be configured as a user interface for a movement function to a page that includes detailed information of the product or a payment function for the product.

Figure 9:
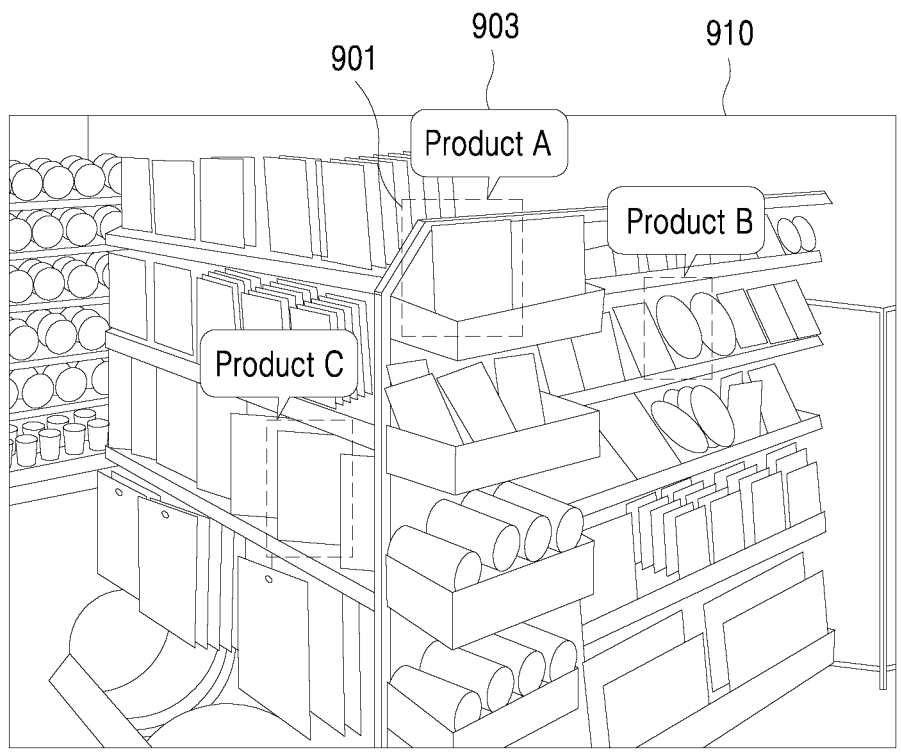
FIGS. 9, 10, and 11 illustrate examples of a process of generating a virtual object for a product recognized in an internal image of an offline store according to exemplary embodiments.
Figure 10:
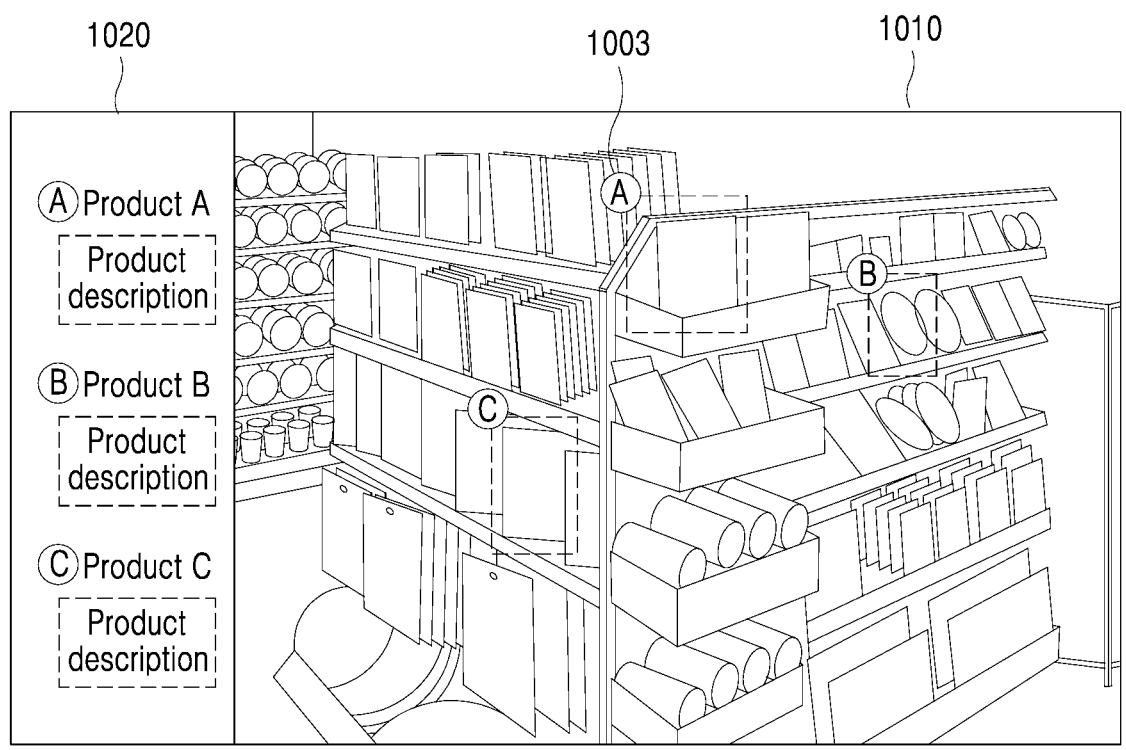

FIGS. 9 and 10 illustrate examples of a process of generating a virtual object for a product recognized in an internal image of an offline store according to exemplary embodiments. Referring to FIG. 9, a virtual object 903 may be provided for each product 901 recognized in an internal image 910 of an offline store. Here, the virtual object 903 may be configured as a user interface for moving to a product detailed page or a payment page. For example, referring to FIG. 9, the virtual object 903 including product information, for example, a product name, etc., may be displayed at a location of the corresponding product 901 with respect to each of the products 901 recognized in the internal image 910. As another example, referring to FIG. 10, a virtual object 1003 may be configured in a form of an identifier indicating a product recognized in an internal image 1010 of an offline store and displayed. Per-product information, for example, a product name, a product description, etc., may be displayed on a separate screen area 1020. It is provided as an example only and a virtual object for a product may be configured using various schemes and forms.

Figure 11:
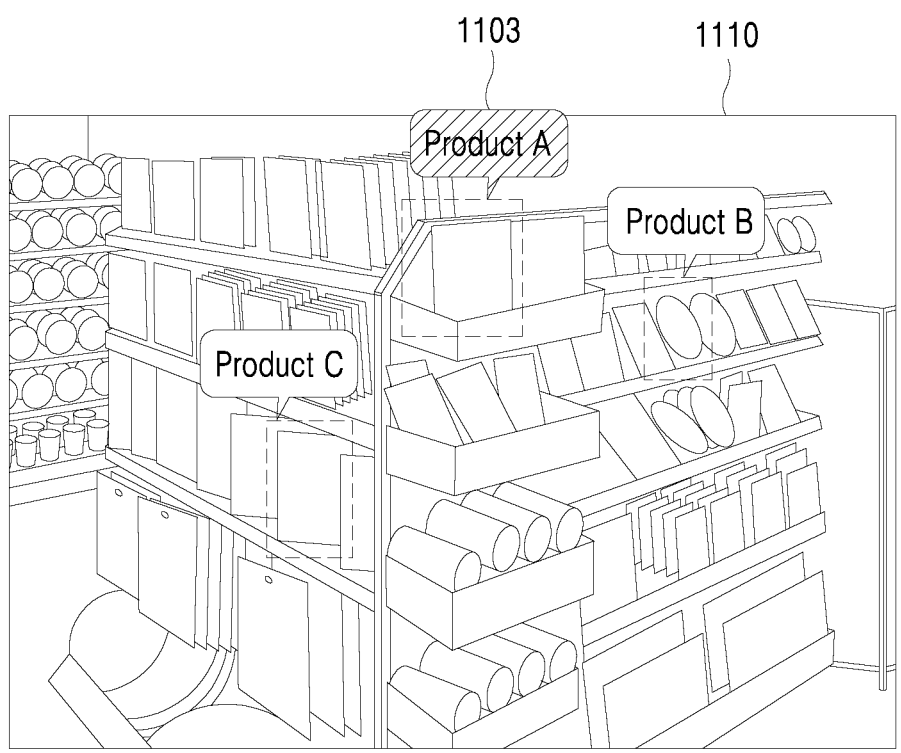

The generator 340 may generate a virtual object with respect to all of the products recognized in the internal image of the offline store. As another example, the generator 340 may generate a virtual object with respect to a portion of the products recognized in an image, for example, a product retrieved by the user, a product recommended to the user, a product specified with respect to the user of the electronic device 110, and the like. As another example, the generator 340 may generate a virtual object with respect to all of the products recognized in an internal image of an offline store and, in this instance, may display a portion of products, for example, event products, designated by a corresponding affiliate to be distinguished from other objects using the virtual object. Referring to FIG. 11, when product A, product B, and product C are recognized in an internal image 1110 of an offline store, the generator 340 may generate and display a virtual object 1103 with respect to each recognized product. Here, the product A designated as an event product may be displayed using the virtual object 1103 distinguished from other products. The virtual object 1103 may be distinguished between products based on a display attribute such as a shape, a color, a size, etc., of the virtual object 1103 or a separate display element.

In operation S450, the interlocker 350 may interwork with at least one service associated with a corresponding product in response to receiving a selection on the product of which a virtual object is configured in the internal image of the offline store through a user interface of the corresponding product. For example, in response to the user of the electronic device 110 selecting a specific product in an internal image of an offline store, it is possible to move to a detailed information page of the selected specific product. Instead of moving to the detailed information page, detailed information of the selected specific product may be provided using a popup screen. As another example, in response to the user of the electronic device 110 selecting the specific product in the internal image of the offline store, the interlocker 350 may perform payment processing on the selected product in conjunction with a payment service.

According to exemplary embodiments, it is possible to provide products displayed in a corresponding store through a real image or a VR image of an offline store in an online open market. Also, it is possible to provide a service so that a user may verify products displayed in the store while directly manipulating an image by providing a manipulation environment, for example, a camera manipulation, a screen manipulation, etc., with respect to the image of the store. According to exemplary embodiments, it is possible to recognize a product in an internal image of an offline store through various object recognition technologies. Also, it is possible to generate and display a virtual object that allows a user to verify and select a product with respect to each of the recognized products. Also, according to exemplary embodiments, it is possible to recommend an affiliate capable of providing an internal image of an offline store in conjunction with local advertising and to provide a search environment capable of searching for a product and an affiliate.

According to exemplary embodiments, it is possible to provide a real image or a VR image that contains an image of an offline store in which products are displayed, instead of simply listing and displaying only product information in an online open market. In this manner, it is possible to provide an experience as if the user looks around an actual offline store and confirms products in person. Accordingly, it is possible to give a sense of presence or pleasure similar to an offline shopping even in an online shopping.

The apparatuses described herein may be implemented using hardware components, software components, and/or a combination thereof. For example, the apparatuses and components described in the exemplary embodiments may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

According to exemplary embodiments, it is possible to provide a fun of purchasing an online open market product by applying an offline shopping experience.

Also, according to exemplary embodiments, it is possible to provide an offline experience optimized for a user for an online shopping.

Also, according to exemplary embodiments, it is possible to provide further practical information to a user by linking a shopping model of providing an offline shopping experience with local advertising.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A product information providing method performed by a product information providing system configured as a computer, the method comprising:
   constructing information including product information and location information for a plurality of offline stores registered as affiliates to an online open market;
   receiving a search request from an electronic device;
   selecting an offline store registered as an affiliate based upon a location of the electronic device and/or profile information associated with the electronic device;
   providing, by the system to the electronic device, an internal image of the offline store in real time through an Internet Protocol (IP) camera service;
   recognizing a product displayed in the offline store in the internal image;
   generating a user interface for the electronic device using a virtual object for the product recognized in the internal image;
   providing a service associated with a corresponding product with respect to a product selected through the user interface;
   providing an image control interface for manipulating the internal image in real time, and
   manipulating the internal image in response to a manipulation request of the electronic device for the internal image through the image control interface,
   wherein, the generating comprises
   configuring, in response to determining that the product recognized in the internal image is an event product associated with an event set by the offline store, the virtual object for the event product to be distinguished from another virtual object for another product such that at least one of a shape, a size and a color of the virtual object for the event product is different from that of said another virtual object,
   wherein the internal image of the offline store is a real image that is captured from an interior of the offline store through a network-based photographing device associated with the IP camera service, and
   wherein the manipulating of the internal image comprises transferring an image control signal to the photographing device in response to the manipulation request, and controlling the photographing device to manipulate the internal image.

2. The method of claim 1, wherein the providing of the internal image comprises recommending at least one adjacent affiliate based on a location specified by the electronic device.

3. The method of claim 1, wherein the providing of the internal image comprises providing at least one affiliate in which a specific product and a substitute product associated with the specific product are included in a pre-stored display product list in response to a user of the electronic device searching for the specific product.

4. The method of claim 1, wherein the recognizing of the product comprises recognizing the product by recognizing at least one of a unique identification code and a text in an image corresponding to the internal image.

5. The method of claim 1, wherein the recognizing of the product comprises recognizing the product in the internal image through an image search in conjunction with an image database on the Internet.

6. The method of claim 1, wherein the generating of the user interface comprises generating and displaying a virtual object that includes information about the product recognized in the internal image.

7. The method of claim 1, wherein the generating of the user interface comprises generating and displaying a virtual object using a user interface for a movement function to a page that includes detailed information of a corresponding product with respect to products recognized in the internal image or a payment function for the corresponding product.

8. The method of claim 1, wherein the generating of the user interface comprises generating and displaying a virtual object distinguished from other products with respect to a portion of products recognized in the internal image.

9. The method of claim 1, wherein the providing of the service comprises moving to a page that includes detailed information of the selected product or providing a payment function for the selected product.

10. A non-transitory computer-readable recording medium storing instructions that, when executed by a processor, cause the processor to perform a product information providing method comprising:
   constructing information including product information and location information for a plurality of offline stores registered as affiliates to an online open market;
   receiving a search request from an electronic device;
   selecting an offline store registered as an affiliate based upon a location of the electronic device and/or profile information associated with the electronic device;
   providing, to an electronic device, an internal image of the offline store in real time through an Internet Protocol (IP) camera service,
   recognizing a product displayed in the offline store in the internal image;
   generating a user interface for display on the electronic device using a virtual object for the product recognized in the internal image;
   moving to a page that includes detailed information or providing a payment function in conjunction with a service associated with a corresponding product with respect to a product selected through the user interface;

providing an image control interface for manipulating the internal image in real time, and manipulating the internal image in response to a manipulation request of the electronic device for the internal image through the image control interface, wherein the generating comprises configuring, in response to determining that the product recognized in the internal image is an event product associated with an event set by the offline store, the virtual object for the event product to be distinguished from another virtual object for another product such that at least one of a shape, a size and a color of the virtual object for the event product is different from that of said another virtual object;

wherein the internal image of the offline store is a real image that is captured from an interior of the offline store through a network-based photographing device associated with the IP camera service, and wherein the manipulating of the internal image comprises transferring an image control signal to the photographing device in response to the manipulation request, and controlling the photographing device to manipulate the internal image.

11. A product information providing system configured as a computer comprising at least one processor configured to execute computer-readable instructions, wherein the at least one processor is configured to provide:

a provider configured to:
construct information including product information and location information for a plurality of offline stores registered as affiliates to an online open market;

receive a search request from an electronic device;

select an offline store registered as an affiliate based upon a location of the electronic device and/or profile information associated with the electronic device; and provide, to an electronic device, an internal image of the offline store in real time through an Internet Protocol (IP) camera service;

a manipulator configured to provide an image control interface for manipulating the internal image in real time and manipulate the internal image in response to a manipulation request of the electronic device for the internal image through the image control interface;

a recognizer configured to recognize a product displayed in the offline store in the internal image;

a generator configured to generate a user interface for the electronic device using a virtual object for the product recognized in the internal image; and an interlocker configured to move to a page that includes detailed information or to provide a payment function in conjunction with a service associated with a corresponding product with respect to a product selected through the user interface, wherein, the generator is further configured to configure, in response to determining that the product recognized in the internal image is an event product associated with an event set by the offline store, the virtual object for the event product to be distinguished from another virtual object for another product such that at least one of a shape, a size and a color of the virtual object for the event product is different from that of said another virtual object, wherein the internal image of the offline store is a real image that is captured from an interior of the offline store through a network-based photographing device associated with the IP camera service, and wherein the internal image is manipulated by transferring an image control signal to the photographing device in response to the manipulation request, and controlling the photographing device to manipulate the internal image.

12. The product information providing system of claim 11, wherein the provider is configured to recommend at least one adjacent affiliate based on a location specified by the electronic device.

13. The product information providing system of claim 11, wherein the provider is configured to provide at least one affiliate in which a specific product and a substitute product associated with the specific product are included in a pre-stored display product list in response to a user of the electronic device searching for the specific product.

14. The product information providing system of claim 11, wherein the generator is configured to generate and display a virtual object that includes information about the product recognized in the internal image.

15. The product information providing system of claim 11, wherein the generator is configured to generate and display a virtual object distinguished from other products with respect to a portion of products recognized in the internal image.

* * * * *